US011546949B2

(12) United States Patent
Tang (10) Patent No.: US 11,546,949 B2
(45) Date of Patent: Jan. 3, 2023

(54) PAGING PROCESSING METHOD, NETWORK DEVICE, USER EQUIPMENT, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/933,480

(22) Filed: Jul. 20, 2020

(65) Prior Publication Data

US 2020/0351960 A1 Nov. 5, 2020

Related U.S. Application Data

(63) Continuation of application No. PCT/CN2018/074051, filed on Jan. 24, 2018.

(51) Int. Cl.
| | | |
|---|---|---|
| *H04W 76/11* | (2018.01) | |
| *H04W 4/029* | (2018.01) | |
| *H04W 76/27* | (2018.01) | |
| *H04W 68/00* | (2009.01) | |
| *H04W 80/02* | (2009.01) | |

(52) U.S. Cl.
CPC .......... *H04W 76/11* (2018.02); *H04W 4/029* (2018.02); *H04W 68/005* (2013.01); *H04W 76/27* (2018.02); *H04W 80/02* (2013.01)

(58) Field of Classification Search
CPC ..... H04W 4/029; H04W 76/11; H04W 76/27; H04W 68/005; H04W 80/02

USPC ......................................................... 370/329
See application file for complete search history.

(56) References Cited

U.S. PATENT DOCUMENTS

| | | | | |
|---|---|---|---|---|
| 2012/0252451 | A1 | 10/2012 | Knauft et al. | |
| 2016/0088462 | A1* | 3/2016 | Jin ..................... | H04W 8/065 |
| | | | | 455/456.5 |
| 2017/0311221 | A1* | 10/2017 | Pudney ................ | H04W 36/24 |

(Continued)

FOREIGN PATENT DOCUMENTS

| | | |
|---|---|---|
| CN | 101350935 A | 1/2009 |
| CN | 101404820 A | 4/2009 |

(Continued)

OTHER PUBLICATIONS

European Examination Report for EP Application 18902157.9 dated Jan. 22, 2021. (9 pages).

(Continued)

*Primary Examiner* — William Nealon
(74) *Attorney, Agent, or Firm* — Young Basile Hanlon & MacFarlane, P.C.

(57) ABSTRACT

Disclosed in the present disclosure is a paging processing method, a network device, a user equipment (UE), and a computer storage medium. The method comprises: obtaining a terminal type of a UE, and cell identifier information or base station identifier information corresponding to the position of the UE; and if the terminal type of the UE is a static type, determining a paging range for the UE on the basis of the cell identifier information or base station identifier information corresponding to the position of the UE.

16 Claims, 2 Drawing Sheets

Acquire a terminal type of a User Equipment (UE), and identification information of a cell or identification information of a base station corresponding to a location at which the UE is located ⟶ 101

When the terminal type of the UE is a static type, determine a paging range for the UE based on the identification information of the cell or the identification information of the base station corresponding to the location at which the UE is located ⟶ 102

(56) References Cited

U.S. PATENT DOCUMENTS

| | | | |
|---|---|---|---|
| 2018/0054831 A1* | 2/2018 | Hu | .................... H04W 72/1273 |
| 2018/0139760 A1* | 5/2018 | Lee | ........................ H04W 28/18 |
| 2019/0059119 A1 | 2/2019 | Hapsari et al. | |

FOREIGN PATENT DOCUMENTS

| | | | | |
|---|---|---|---|---|
| CN | 103888931 A | 6/2014 | | |
| CN | 105027646 A | 11/2015 | | |
| CN | 105794286 A | 7/2016 | | |
| CN | WO 2016/186416 A1 * | 11/2016 | ............ | H04W 68/02 |
| CN | 106304336 A | 1/2017 | | |
| CN | 106416397 A | 2/2017 | | |
| JP | 2016521058 A | 7/2016 | | |
| JP | 2017507584 A | 3/2017 | | |
| WO | 2014013660 A1 | 1/2014 | | |
| WO | 2014186969 A1 | 11/2014 | | |
| WO | 2015144594 A1 | 10/2015 | | |
| WO | 2016140275 A1 | 9/2016 | | |
| WO | 2016163112 A1 | 10/2016 | | |
| WO | 2016186416 A1 | 11/2016 | | |
| WO | 2017078143 A1 | 5/2017 | | |
| WO | 2017122588 A1 | 7/2017 | | |
| WO | 2017139910 A1 | 8/2017 | | |

OTHER PUBLICATIONS

Australia First Examination Report for AU Application 2018404053 dated Mar. 15, 2021. (6 pages).
Extended European Search Report for EP Application 18902157.9 dated Aug. 7, 2020.
3GPP TS 36.300 V14.0.0 (Sep. 2016); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
International Search Report for PCT/CN2018/074051 dated Oct. 16, 2018.
Australian Second Examination Report for AU Application 2018404053 dated May 21, 2021. (5 pages).
Communication pursuant to Article 94(3) EPC for EP Application 18902157.9 dated May 26, 2021. (8 pages).
Korean Office Action with English Translation for KR Application 10-2020-7023138 dated Apr. 28, 2021. (10 pages).
Australian Examination Report for AU Application 2018404053 dated Dec. 17, 2021. (4 pages).
Communication pursuant to Article 94(3) EPC for EP Application 18902157.9 dated Nov. 23, 2021. (7 pages).
Chinese Decision of Rejection with English Translation for CN Application 2020108767163 dated Jan. 7, 2022. (16 pages).
Chinese Second Office Action with English Translation for CN Application 202010876716.3 dated Oct. 11, 2021. (17 pages).
Indian Examination Report for IN Application 202017030872 dated Aug. 17, 2021. (7 pages).
Japanese Notice of Reasons for Refusal with English Translation for JP Application 2020540312 dated Sep. 28, 2021. (13 pages).
SA WG2 Meeting #104, Dublin, Ireland, S2-142534, Ericsson, eCSFB Solution: UE radio capabilities consideration during PLMN and RAT selection, Jul. 7-11.
Communication pursuant to Article 94(3) EPC for EP Application 18902157.9 dated Mar. 17, 2022. (5 pages).
Japanese Office Action with English Translation for JP Application 2020540312 dated Apr. 25, 2022. (6 pages).
Communication pursuant to Article 94(3) EPC for EP Application 18902157.9 dated Aug. 4, 2022. (6 pages).
Canadian Examination Report for CA Application 3088039 dated Jul. 14, 2022. (7 pages).

* cited by examiner

Acquire a terminal type of a User Equipment (UE), and identification information of a cell or identification information of a base station corresponding to a location at which the UE is located — 101

When the terminal type of the UE is a static type, determine a paging range for the UE based on the identification information of the cell or the identification information of the base station corresponding to the location at which the UE is located — 102

PAGING PROCESSING METHOD, NETWORK DEVICE, USER EQUIPMENT, AND COMPUTER STORAGE MEDIUM

CROSS-REFERENCE TO RELATED APPLICATION(S)

This application is a continuation application of International Application No. PCT/CN2018/074051, filed on Jan. 24, 2018, the entire disclosure of which is hereby incorporated by reference.

TECHNICAL FIELD

The disclosure relates to the technical field of information processing, in particular to a method for processing paging, a network device, a User Equipment (UE) and a computer storage medium.

BACKGROUND

A 5G UE is similar to a UE in LTE. First, the UE performs an attachment registration to a core network. Then context information of the UE exists at the core network. One piece of the information is location area information (i.e., a TA (Tracking Area) list). When there is a paging for the UE, the core network sends a paging message through all base stations in the TA, and triggers these base stations to page for the UE in all cells under the base stations. Therefore, a paging for a UE is at least that all cells in a TA range send the paging message. However, for a 5G network, a large quantity of Internet of Things terminals may exist, and such terminals stay only inside one cell, without mobility. Therefore, for such terminals, if the paging is still sent within a TA range in a traditional mode, wireless resources will be greatly wasted.

SUMMARY

Implementations of the present disclosure provide a method for processing paging, a network device, a User Equipment (UE) and a computer storage medium.

A method for processing paging provided by an implementation of the disclosure, includes: acquiring a terminal type of a User Equipment (UE), and identification information of a cell or identification information of a base station corresponding to a location at which the UE is located; and when the terminal type of the UE is a static type, based on the identification information of the cell or the identification information of the base station corresponding to the location at which the UE is located, determining a paging range for the UE.

A method for processing paging provided by an implementation of the disclosure, includes: reporting a terminal type of the UE, and identification information of a cell or identification information of a base station corresponding to a location at which the UE is located, to a network side.

A network device provided by an implementation of the disclosure, includes: a first communication unit, for acquiring a terminal type of a User Equipment (UE), and identification information of a cell or identification information of a base station corresponding to a location at which the UE is located; and a first processing unit, for determining, when the terminal type of the UE is a static type, a paging range for the UE based on the identification information of the cell or the identification information of the base station corresponding to the location at which the UE is located.

A UE provided by an implementation of the present disclosure, includes: a second communication unit, for reporting a terminal type of the UE, and identification information of a cell or identification information of a base station corresponding to a location at which the UE is located, to a network side.

A network device provided by an implementation of the present disclosure includes: a processor and a memory for storing a computer program which is capable of being run on the processor.

The processor is used for executing the computer program to perform the acts of the above method.

A User Equipment (UE) provided by an implementation of the present disclosure includes: a processor and a memory for storing a computer program which is capable of being run on the processor.

The processor is used for executing the computer program to perform the acts of the above method.

An implementation of the present disclosure provides a computer storage medium, wherein the computer storage medium stores computer-executable instructions that when executed implement acts of the aforementioned method.

DETAILED DESCRIPTION

To understand features and technical contents of implementations of the present disclosure in more detail, the implementation of the implementations of the present disclosure will be described in detail below with reference to the drawings, which are used for reference only and are not intended to limit the implementations of the present disclosure.

Implementation One

Figure 1:
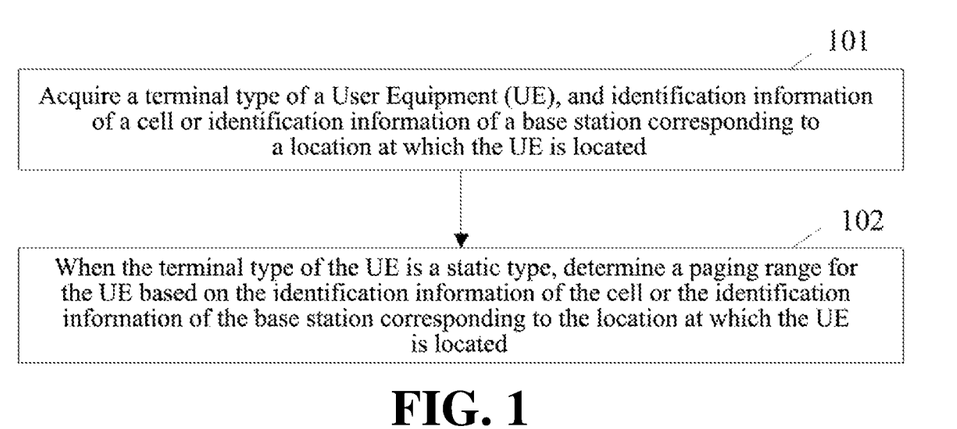
FIG. 1 is a schematic flowchart of a method for processing paging according to an implementation of the present disclosure.

The implementation of the present disclosure provides a method for processing paging, as shown in FIG. 1, including acts 101 and 102.

In act 101, a terminal type of a User Equipment (UE), and identification information of a cell or identification information of a base station corresponding to a location at which the UE is located are acquired.

In act 102, when the terminal type of the UE is a static type, a paging range for the UE is determined based on the identification information of the cell or the identification information of the base station corresponding to the location at which the UE is located.

The solution provided by this implementation may be applied to a network device on a network side, especially to a network device in a core network.

Terminal types of the UE may contain a variety of division modes, for example, they may be divided into terminals of a static type and terminals of a mobile type, and of course terminals of another type may also exist, which is not exhaustive in this implementation.

The following is a detailed description of the above acts.

In the aforementioned act 101, a variety of processing modes may exist based on different states of the UE to acquire the terminal type of the User Equipment (UE), and the identification information of the cell or the identification information of the base station corresponding to the location at which the UE is located.

Mode 1 includes: when the UE initially registers in a network, the terminal type of the UE is acquired through an attachment request of the UE, and the identification information of the cell or the identification information of the base station, at which the UE is located, is acquired through the attachment request.

That is to say, when performing an initial registration, the UE will report a type of the UE and the identification information of the cell or the identification information of the base station, at which the UE is located, to the core network.

Specifically, when the UE initially registers in a network, the UE points out in the attachment request that the terminal type (herein regarding the terminal type, the terminal of the static type is concerned in this implementation) is of a "static type" terminal, and at the same time gives the identification information of the cell or the identification information of the base station, at which the UE is currently located. Correspondingly, the core network (especially the network device in the core network) may store the terminal type of the UE and the identification information of the cell or the identification information of the base station corresponding to the location at which the UE is located as part of context information of the UE.

Mode 2: when the UE initiates a location update, the terminal type of the UE is acquired through a location update request of the UE, and the identification information of the cell or the identification information of the base station, at which the UE is located, is acquired through the location update request.

Specifically, when the UE initiates the location update, the UE points out in the location update request that the terminal type (herein regarding the terminal type, the terminal of the static type is concerned in this implementation) is of a "static type" terminal, and at the same time gives the identification information of the cell or the identification information of the base station, at which the UE is currently located. Correspondingly, the core network (especially the network device in the core network) may store the terminal type of the UE and the identification information of the cell or the identification information of the base station corresponding to the location at which the UE is located as part of context information of the UE.

Mode 3: when establishing a Radio Resource Control (RRC) connection, the UE receives the terminal type of the UE and the identification information of the cell or the identification information of the base station, at which the UE is located of the UE, sent from the base station of the UE; wherein, the base station acquires the terminal type through an RRC signaling or a MAC CE sent by the UE, and acquires the identification information of the cell or the identification information of the base station at which the UE is located.

That is to say, during an RRC connection establishment, the UE reports through the RRC signaling or the MAC CE that the type of the UE is a static terminal type to the base station; after the base station receives that the UE is of the static terminal type, it sends the identification information of the cell or the identification information of the base station, at which the UE is located and information that the UE is a terminal of the static type to the core network; correspondingly, the core network (i.e., the network device) stores the terminal type of the UE and the identification information of the cell or the identification information of the base station corresponding to the location at which the UE is located as part of context information of the UE.

Further, in the aforementioned act 102, the paging range for the UE is determined based on the identification information of the cell or the identification information of the base station corresponding to the location at which the UE is located. Since there are two kinds of modes in which the UE reports its location, the identification information of the cell and the identification information of the base station, accordingly, following two kinds of processing may exist.

Processing 1 includes: when the stored identification information is the identification information of the cell, an indication message for sending paging is triggered to the base station at which the cell is located, and the identification information of the cell is carried in the indication message, to indicate, through the indication message, the base station to send a paging message in the cell corresponding to the identification information of the cell.

Processing 2 includes: when the stored identification information is the identification information of the base station, an indication message for triggering paging is sent to the base station, wherein the indication message for triggering paging is used for indicating the base station to send a paging message in all cells.

Specifically, when the core network receives triggering of paging for the static type terminal, it acquires the identification information of the cell or the identification information of the base station, at which the UE is located, and then sends to a designated base station to trigger the base station to send the paging. If the identification information of the cell is stored, the core network carries the identification information of the cell in a message triggering the base station to send the paging, then the base station only sends the paging message in the indicated cell. If the identification information of the base station is stored, the core network triggers, according to the identification information of the base station, a paging message to be sent in the designated base station, then the base station sends the paging message in all cells of the base station.

On the basis of the foregoing, it is also concerned that the UE detects for whether a change of a current cell or a base station has occurred, and such detection may be performed by the UE side.

The operation of the network side in this implementation may be corresponding to the way whether the UE re-detects the change of the cell or the base station, and may be: a timer is set, if the timer expires, the UE is triggered to re-detect whether a change of the identification information of the cell occurs, or the UE is triggered to detect whether a change of the identification information of the base station corresponding to the current cell occurs.

It should be pointed out that in this implementation, the operation that a timer is set to trigger the UE to re-detect whether the identification of the cell or the identification of the base station changes may be set at the network side or at the UE side of course, but this implementation makes the description from the perspective of the network side.

It can be seen that by adopting the above solution, for a UE whose terminal type is of a static terminal, a paging range for the UE can be determined according to identification information of a cell or identification information of a base station corresponding to a location at which the UE is located. Thereby, for partial terminals therein with a static type, paging may be performed for different ranges of cells or base stations, which can avoid a problem of resource waste brought by performing paging in a large range regardless of a type of a UE, achieving a purpose of reducing paging load.

Implementation Two

The implementation of the disclosure provides a method for processing paging, including: a terminal type of the UE, and identification information of a cell or identification information of a base station corresponding to a location at which the UE is located, are reported to a network side.

The solution provided in this implementation may be applied to a User Equipment (UE) in a communication network. Correspondingly, the network side may contain at least one of a base station on the network side and a network device in a core network.

Terminal types of the UE may contain a variety of division modes, for example, they may be divided into terminals of a static type and terminals of a mobile type, and of course terminals of another type may exist, which is not exhaustive in this implementation.

The following is a detailed description of the above processing.

The terminal type of the UE, and the identification information of the cell or the identification information of the base station corresponding to the location at which the UE is located, are reported to the network side, includes: when the UE initially registers in a network, the terminal type of the UE, and the identification information of the cell or the identification information of the base station corresponding to the location at which the UE is located are added to an attachment request; and the attachment request is sent to the network side.

That is to say, when the UE performs an initial registration, it will report a type of the UE and the identification information of the cell or the identification information of the base station, at which the UE is located, to the core network.

Specifically, when the UE initially registers in a network, the UE points out in the attachment request that the terminal type (herein regarding the terminal type, the terminal of the static type is concerned in this implementation) is of a "static type" terminal, and at the same time gives the identification information of the cell or the identification information of the base station, at which the UE is currently located; correspondingly, the core network (especially the network device in the core network) may store the terminal type of the UE and the identification information of the cell or the identification information of the base station corresponding to the location at which the UE is located as part of context information of the UE.

Or, when the UE initiates a location update, the terminal type of the UE, and the identification information of the cell or the identification information of the base station corresponding to the location at which the UE is located are added to a location update request; and the location update request is sent to the network side. The network side described here may be considered as a network device in the core network.

Or, when establishing an RRC connection, the UE sends, through an RRC signaling or a MAC CE, the terminal type, and the identification information of the cell or the identification information of the base station, at which the UE is located, to the base station side; wherein, the base station is configured to send the terminal type, and the identification information of the cell or the identification information of the base station, at which the UE is located, to the network side to store.

That is to say, during an RRC connection establishment, the UE reports through the RRC signaling or the MAC CE that the type of the UE is a static terminal type to the base station; after the base station receives that the UE is of the static terminal type, it sends the identification information of the cell or the identification information of the base station, at which the UE is located and information that the UE is a terminal of the static type to the core network; correspondingly, the core network (i.e., the network device) stores the terminal type of the UE and the identification information of the cell or the identification information of the base station corresponding to the location at which the UE is located as part of context information of the UE.

On the basis of the foregoing, about that the UE will also detect for whether a change of a current cell or a base station has occurred, in this implementation, the UE is triggered by setting a timer to re-detect whether the identification of the cell or the identification of the base station changes, and it may be set at the network side or at the UE side of course, but this implementation makes the description from the perspective of the UE side.

This implementation focuses on triggering on the UE side, which may be: a timer is set, if the timer expires, the UE is triggered to re-detect whether a change of the identification information of the cell occurs, or the UE is triggered to detect whether a change of the identification information of the base station corresponding to the current cell occurs.

Specifically, the UE side re-detects the updated identification information of the cell or the base station, includes: when the identification information of the cell is stored, if the UE detects that identification information of a cell of a current cell is different from the stored identification information of the cell, the UE re-initiates registration or location update processing to send the updated identification information of the cell to the network side; or, an RRC connection is re-initiated, and the terminal type and the updated identification information of the cell, sent from the UE, are re-sent to the network side.

If the identification information of the cell is stored, when the UE detects and finds that the cell identification of the current cell is different from previously stored identification information of a cell, the UE is triggered to re-initiate a registration or a location update, and an identification information of a new cell is sent to the core network to store; or, when the UE detects and finds that the cell identification of the current cell is different from previously stored identification information of a cell, an RRC connection is re-initiated and a "static type" of the terminal is reported to the base station, and a gNB is triggered to re-send the identification information of the cell of the UE to the core network to store.

When the identification information of the base station is stored, if the UE detects that identification information of a base station of a current base station is different from the stored identification information of the base station, registration or location update processing is re-initiated to send the updated identification information of the base station to the network side; or, an RRC connection is re-initiated, and the terminal type and the updated identification information of the base station are re-sent to the network side.

That is, if the identification information of the base station is stored, when the UE detects and finds that the identification of the base station corresponding to the current cell is different from previously stored identification information of a base station, the UE is triggered to re-initiate a registration or a location update, and an identification information of a new base station is sent to the core network to store; or, if the identification information of the base station is stored, when the UE detects and finds that the identification of the base station corresponding to the current cell is different from previously stored identification information of a base station, an RRC connection is re-initiated and a "static type" of the terminal is reported to the base station, and a gNB is triggered to re-send the identification information of the base station of the UE to the core network to store.

It can be seen that by adopting the above solution, for a UE a terminal type of which is of a static terminal, a paging range for the UE can be determined according to identification information of a cell or identification information of a base station corresponding to a location at which the UE is located. Thereby, for partial terminals therein with a static type, paging may be performed for different ranges of cells or base stations, which can avoid a problem of resource waste brought by performing paging in a larger range regardless of a type of a UE, achieving a purpose of reducing paging coincidences.

Implementation Three

Figure 2:
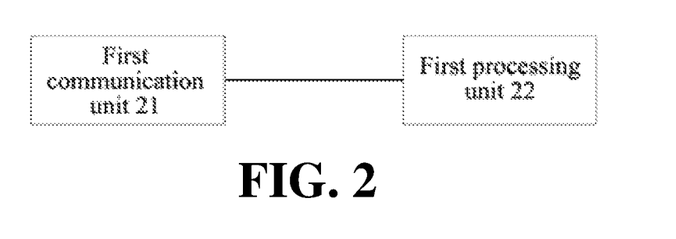
FIG. 2 is a schematic diagram of structure of a network device according to an implementation of the present disclosure.

The implementation of the present disclosure provides a network device. As shown in FIG. 2, the network device includes: a first communication unit 21, acquiring a terminal type of a User Equipment (UE), and identification information of a cell or identification information of a base station corresponding to a location at which the UE is located; and a first processing unit 22, determining, based on the identification information of the cell or the identification information of the base station corresponding to the location at which the UE is located, a paging range for the UE, when the terminal type of the UE is a static type.

The solution provided by this implementation may be applied to a network device on a network side, especially to a network device in a core network.

Terminal types of the UE may contain a variety of division modes, for example, they may be divided into terminals of a static type and terminals of a mobile type, and of course terminals of another type may exist, which is not exhaustive in this implementation.

The following is a detailed description of the above acts.

For acquiring the terminal type of the User Equipment (UE), and the identification information of the cell or the identification information of the base station corresponding to the location at which the UE is located, a variety of processing modes may exist based on different states of the UE.

Mode 1 includes: a first communication unit 21, when the UE initially registers in a network, acquires the terminal type of the UE through an attachment request of the UE, and acquires the identification information of the cell or the identification information of the base station, at which the UE is located, through the attachment request.

That is to say, when the UE performs an initial registration, it will report a type of the UE and the identification information of the cell or the identification information of the base station, at which the UE is located, to the core network.

Specifically, when the UE initially registers in a network, the UE points out in the attachment request that the terminal type (herein regarding the terminal type, the terminal of the static type is concerned in this implementation) is of a "static type" terminal, and at the same time gives the identification information of the cell or the identification information of the base station, at which the UE is currently located; correspondingly, the core network (especially the network device in the core network) may store the terminal type of the UE and the identification information of the cell or the identification information of the base station corresponding to the location at which the UE is located as part of context information of the UE.

Mode 2: the first communication unit 21, when the UE initiates a location update, acquires the terminal type of the UE through a location update request, and acquires the identification information of the cell or the identification information of the base station, at which the UE is located, through the location update request.

Specifically, when the UE initiates the location update, the UE points out in the location update request that the terminal type (herein regarding the terminal type, the terminal of the static type is concerned in this implementation) is of a "static type" terminal, and at the same time gives the identification information of the cell or the identification information of the base station, at which the UE is currently located; correspondingly, the core network (especially the network device in the core network) may store the terminal type of the UE and the identification information of the cell or the identification information of the base station corresponding to the location at which the UE is located as part of context information of the UE.

Mode 3: the first communication unit 21, when the UE establishes an RRC connection, receives the terminal type of the UE and the identification information of the cell or the identification information of the base station, at which the UE is located of the UE, sent from the base station of the UE; wherein, the base station acquires the terminal type through an RRC signaling or a MAC CE sent by the UE, and acquires the identification information of the cell or the identification information of the base station at which the UE is located.

That is to say, during an RRC connection establishment, the UE reports through the RRC signaling or the MAC CE that the type of the UE is a static terminal type to the base station; after the base station receives that the UE is of the static terminal type, it sends the identification information of the cell or the identification information of the base station, at which the UE is located and information that the UE is a terminal of the static type to the core network; correspondingly, the core network (i.e., the network device) stores the terminal type of the UE and the identification information of the cell or the identification information of the base station corresponding to the location at which the UE is located as part of context information of the UE.

Further, for the paging range for the UE is determined based on the identification information of the cell or the identification information of the base station corresponding to the location at which the UE is located, since there are two kinds of modes in which the UE reports its location, the identification information of the cell and the identification information of the base station, accordingly, following two kinds of processing may exist.

Processing 1: the first processing unit 22, when the stored identification information is the identification information of the cell, triggers an indication message for sending paging to the base station at which the cell is located, and carries the identification information of the cell in the indication message, to indicate, through the indication message, the base station to send a paging message in the cell corresponding to the identification information of the cell.

Processing 2: the first processing unit 22, when the stored identification information is the identification information of the base station, sends an indication message for triggering paging to the base station, wherein the indication message for triggering paging is used for indicating the base station to send a paging message in all cells.

Specifically, when the core network receives triggering of paging for the static type terminal, it acquires the identification information of the cell or the identification information of the base station, at which the UE is located, and then sends to a designated base station to trigger the base station to send the paging. If the identification information of the cell is stored, the core network carries the identification information of the cell in a message triggering the base station to send the paging, then the base station only sends the paging message in the indicated cell. If the identification information of the base station is stored, the core network triggers, according to the identification information of the base station, a paging message to be sent in the designated base station, then the base station sends the paging message in all cells of the base station.

On the basis of the foregoing, it is also concerned that the UE detects for whether a change of a current cell or a base station has occurred, and such detection may be performed by the UE side.

The operation of the network side in this implementation may be corresponding to the way whether the UE re-detects the change of the cell or the base station, and may be: the first processing unit 22 sets a timer, if the timer expires, triggers the UE to re-detect whether a change of the identification information of the cell occurs, or triggers the UE to detect whether a change of the identification information of the base station corresponding to the current cell occurs.

It should be pointed out that in this implementation, the operation that a timer is set to trigger the UE to re-detect whether the identification of the cell or the identification of the base station changes may be set at the network side or at the UE side of course, but this implementation makes the description from the perspective of the network side.

It can be seen that by adopting the above solution, for a UE whose terminal type is of a static terminal, a paging range for the UE can be determined according to identification information of a cell or identification information of a base station corresponding to a location at which the UE is located. Thereby, for partial terminals therein with a static type, paging may be performed for different ranges of cells or base stations, which can avoid a problem of resource waste brought by performing paging in a large range regardless of a type of a UE, achieving a purpose of reducing paging load.

Implementation Four

Figure 3:
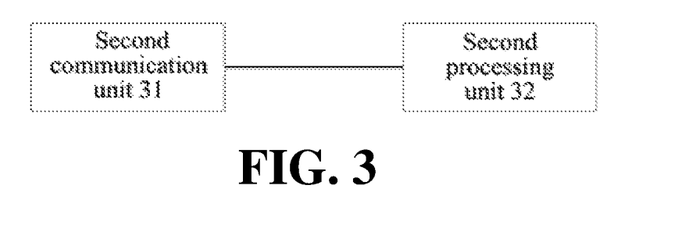
FIG. 3 is a structural schematic diagram of a UE according to an implementation of the present disclosure.

The implementation of the present disclosure provides a UE. As shown in FIG. 3, the UE includes: a second communication unit 31, reporting a terminal type of the UE, and identification information of a cell or identification information of a base station corresponding to a location at which the UE is located, to a network side.

The solution provided in this implementation may be applied to a User Equipment (UE) in a communication network. Correspondingly, the network side may contain at least one of a base station on the network side and a network device in a core network.

Terminal types of the UE may contain a variety of division modes, for example, they may be divided into terminals of a static type and terminals of a mobile type, and of course terminals of another type may exist, which is not exhaustive in this implementation.

The following is a detailed description of the above processing.

The terminal type of the UE, and the identification information of the cell or the identification information of the base station corresponding to the location at which the UE is located, are reported to the network side, specifically:

the UE further includes: a second processing unit 32, when an initial registration is made in a network, adding the terminal type of the UE, and the identification information of the cell or the identification information of the base station corresponding to the location at which the UE is located to an attachment request; the second communication unit 31 sends the attachment request to the network side. That is to say, when the UE performs an initial registration, it will report a type of the UE and the identification information of the cell or the identification information of the base station, at which the UE is located, to the core network.

Specifically, when the UE initially registers in a network, the UE points out in the attachment request that the terminal type (herein regarding the terminal type, the terminal of the static type is concerned in this implementation) is of a "static type" terminal, and at the same time gives the identification information of the cell or the identification information of the base station, at which the UE is currently located; correspondingly, the core network (especially the network device in the core network) may store the terminal type of the UE and the identification information of the cell or the identification information of the base station corresponding to the location at which the UE is located as part of context information of the UE.

Or, a second processing unit 32, when a location update is initiated, adds the terminal type of the UE, and the identification information of the cell or the identification information of the base station corresponding to the location at which the UE is located to a location update request; the second communication unit 31 sends the location update request to the network side.

Or, the second communication unit 31, when the UE establishes an RRC connection, sends, through an RRC signaling or a MAC CE, the terminal type, and the identification information of the cell or the identification information of the base station, at which the UE is located, to the base station side; wherein, the base station is configured to send the terminal type, and the identification information of the cell or the identification information of the base station, at which the UE is located, to the network side to store.

That is to say, during an RRC connection establishment, the UE reports through the RRC signaling or the MAC CE that the type of the UE is a static terminal type to the base station; after the base station receives that the UE is of the static terminal type, it sends the identification information of the cell or the identification information of the base station, at which the UE is located and information that the UE is a terminal of the static type to the core network; correspondingly, the core network (i.e., the network device) stores the terminal type of the UE and the identification information of the cell or the identification information of the base station corresponding to the location at which the UE is located as part of context information of the UE.

On the basis of the foregoing, about that the UE will also detect for whether a change of a current cell or a base station has occurred, in this implementation, the UE is triggered by setting the timer to re-detect whether the identification of the cell or the identification of the base station changes, and it may be set at the network side or at the UE side of course, but this implementation makes the description from the perspective of the UE side.

This implementation focuses on triggering on the UE side, which may be: a timer is set, if the timer expires, the UE is triggered to re-detect whether a change of the identification information of the cell occurs, or the UE is triggered to detect whether a change of the identification information of the base station corresponding to the current cell occurs.

Specifically, the UE side re-detects the updated identification information of the cell or the base station, includes: the second processing unit 32, when the identification information of the cell is stored, if detecting that identification information of a cell of a current cell is different from the stored identification information of the cell, re-initiates registration or location update processing, and sends, through the second communication unit, the updated identification information of the cell to the network side; or, re-initiates an RRC connection, and re-sends, through the second communication unit, the terminal type and the updated identification information of the cell to the network side.

If the identification information of the cell is stored, when the UE detects and finds that the identification of the cell of the current cell is different from previously stored identification information of a cell, the UE is triggered to re-initiate a registration or a location update, and identification information of a new cell is sent to the core network to store; or, when the UE detects and finds that the identification of the cell of the current cell is different from previously stored identification information of a cell, an RRC connection is re-initiated and a "static type" of the terminal is reported to the base station, and a gNB is triggered to re-send the identification information of the cell of the UE to the core network to store.

The second processing unit, when the identification information of the base station is stored, if detecting that identification information of a base station of a current base station is different from the stored identification information of the base station, re-initiates registration or location update processing, and sends, through the second communication unit, the updated identification information of the base station to the network side; or, re-initiates an RRC connection, and re-sends, through the second communication unit, the terminal type and the updated identification information of the base station to the network side.

That is, if the identification information of the base station is stored, when the UE detects and finds that the identification of the base station corresponding to the current cell is different from previously stored identification information of a base station, the UE is triggered to re-initiate a registration or a location update, and an identification information of a new base station is sent to the core network to store; or, if the identification information of the base station is stored, when the UE detects and finds that the identification of the base station corresponding to the current cell is different from previously stored identification information of a base station, an RRC connection is re-initiated and a "static type" terminal is reported to the base station, and a gNB is triggered to re-send the identification information of the base station of the UE to the core network to store.

It can be seen that by adopting the above solution, for a UE a terminal type of which is of a static terminal, a paging range for the UE can be determined according to identification information of a cell or identification information of a base station corresponding to a location at which the UE is located. Thereby, for partial terminals therein with a static type, paging may be performed for different ranges of cells or base stations, which can avoid a problem of resource waste brought by performing paging in a larger range regardless of a type of a UE, achieving a purpose of reducing paging coincidences.

Figure 4:
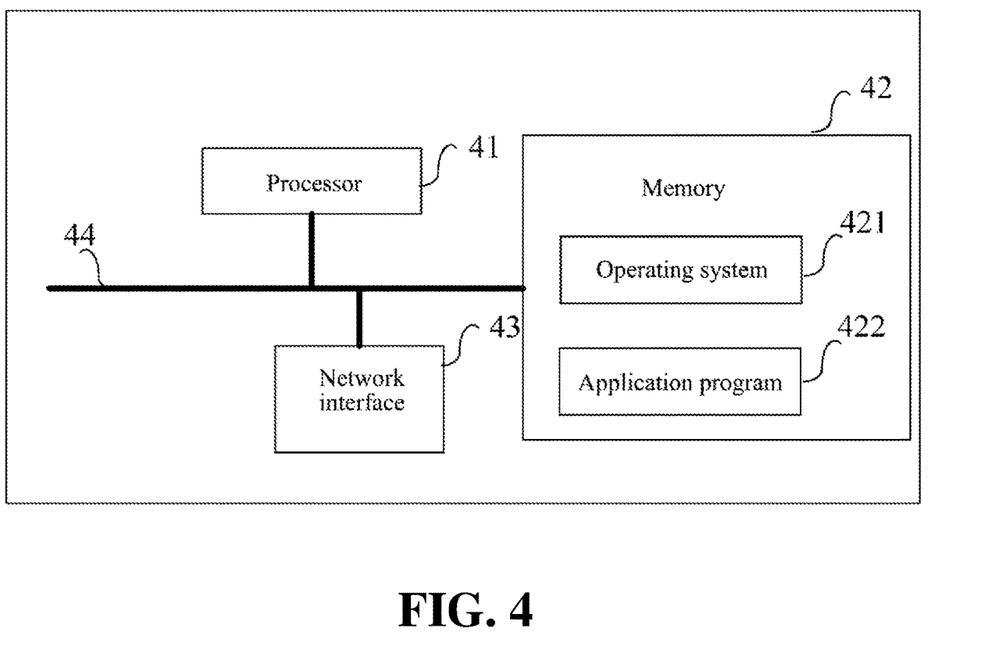
FIG. 4 is a schematic diagram of architecture of hardware according to an implementation of the present disclosure.

An implementation of the present disclosure also provides architecture of hardware composition of a user equipment or a receiver device, which includes at least one processor 41, a memory 42, and at least one network interface 43, as shown in FIG. 4. The various components are coupled together by a bus system 44. It may be understood that the bus system 44 is used for implementing connection and communication between these components. In addition to a data bus, the bus system 44 includes a power bus, a control bus, and a status signal bus. However, for clarity, all kinds of buses are uniformly referred to as a bus system 44 in the FIG. 4.

It should be understood that the memory 42 in the implementation of the present disclosure may be a volatile memory or a non-volatile memory, or it may include both volatile and non-volatile memory.

In some implementations, the memory 42 stores following elements, executable modules or data structures, or subsets thereof, or extended sets thereof: an operating system 421 and an application program 422.

Herein, the processor 41 is configured to: be capable of processing acts in the method in the aforementioned implementation one or two, which will not be repeated here.

An implementation of the present disclosure provides a computer storage medium storing computer executable instructions, which implement, when executed, acts in the method of the aforementioned implementation one or two.

The above device in the implementations of the present disclosure may also be stored in a computer readable storage medium when it is implemented in the form of a software function module and sold or used as an independent product. Based on this understanding, the technical solutions in the implementations of the present disclosure, in essence, or the part contributing to the prior art, may be embodied in the form of a software product stored in a storage medium, including several instructions for causing a computer device (which may be a personal computer, a server, or a network device, etc.) to perform all or part of the methods described in various implementations of the present disclosure. The aforementioned storage medium includes a U disk, a mobile hard disk, a read-only memory (ROM), a magnetic disk or an optical disk, and another media capable of storing program codes. Thus, the implementations of the present disclosure are not limited to any specific combination of hardware and software.

Correspondingly, an implementation of the present disclosure also provides a computer storage medium in which a computer program is stored, and the computer program is configured to execute the data scheduling method in the implementations of the present disclosure.

Although the preferable implementations of the present disclosure have been disclosed for illustrative purposes, those skilled in the art will recognize that various modifications, additions and substitutions are also possible, and therefore, the scope of the present disclosure should not be limited to the above implementations.

What is claimed is:

1. A method for processing paging, performed by a network device, comprising:
   acquiring identification information of a cell corresponding to a location at which a User Equipment (UE) is located;
   storing the acquired identification of the cell; and determining a paging TA range for the UE based on the identification information of the cell corresponding to the location at which the UE is located, wherein acquiring the identification information of the cell corresponding to the location at which the UE is located, comprises:

when the UE establishes an RRC connection, receiving, from the base station where the UE is located, the identification information of the cell, at which the UE is located, wherein, the identification information of the cell at which the UE is located, is acquired by the base station, wherein based on the identification information of the cell corresponding to the location at which the UE is located, determining the paging TA range for the UE, comprises:

triggering an indication message for sending paging to the base station at which the cell is located, and carrying the identification information of the cell in the indication message to indicate, through the indication message, the base station at which the cell is located to send a paging message in the cell corresponding to the identification information of the cell, and wherein the method further comprises:

setting a timer, wherein when the timer expires, the UE is triggered to re-detect whether a change of the identification information of the cell occurs; and receiving from the UE updated identification information of the cell, in case that the UE re-initiate registration or location update processing to send the updated identification information of the cell to the network device; or re-initiate an RRC connection and re-send the updated identification information of the cell to the network device when the UE detects that identification information of a cell of a current cell is different from the stored identification information of the cell.

2. The method according to claim 1, wherein acquiring the identification information of the cell corresponding to the location at which the UE is located, comprises:

when in a Radio Resource Control (RRC) connection state, receiving, from the base station where the UE is located, the identification information of the cell, at which the UE is located, wherein the base station, through an RRC signaling or a MAC CE sent by the UE, acquires the identification information of the cell at which the LTE is located.

3. A method for processing paging, comprising:

reporting identification information of a cell or identification information of a base station corresponding to a location at which a User Equipment (LE) is located, to a network device, wherein reporting the identification information of the cell or the identification information of the base station corresponding to the location at which the UE is located to the network device, comprises:

when establishing an RRC connection, sending, by the UE to the base station, the identification information of the cell or the identification information of the base station, at which the UE is located, wherein when the identification information of the cell is stored, in case that the UE detects that identification information of a cell of a current cell is different from the stored identification information of the cell, re-initiating, by the UE, registration or location update processing to send the updated identification information of the cell to the network device; or, re-initiating an RRC connection, and re-sends the updated identification information of the cell to the network device.

4. The method according to claim 3, wherein reporting the identification information of the cell or the identification information of the base station corresponding to the location at which the LE is located to the network device, comprises:

when the UE initially registers in a network, adding the identification information of the cell or the identification information of the base station corresponding to the location at which the UE is located to an attachment request; and sending the attachment request to the network device.

5. The method according to claim 3, wherein reporting the identification information of the cell or the identification information of the base station corresponding to the location at which the UE is located to the network device, comprises:

when the UE initiates a location update, adding the identification information of the cell or the identification information of the base station corresponding to the location at which the UE is located to a location update request; and sending the location update request to the network device.

6. The method according to claim 3, wherein when establishing an RRC connection, the identification information of the cell or the identification information of the base station, at which the UE is located, is sent, by the UE to the base station through an RRC signaling or a MAC CE; wherein, the base station is configured to send the identification information of the cell or the identification information of the base station, at which the UE is located, to the network device to store.

7. The method according to claim 3, wherein the method further comprises:

when the identification information of the base station is stored, in case that the UE detects that identification information of a base station of a current base station is different from the stored identification information of the base station, re-initiating registration or location update processing to send the updated identification information of the base station to the network device; or, re-initiating an RRC connection, and re-sending the updated identification information of the base station to the network-aide device.

8. The method according to claim 3, wherein the method further comprises:

setting a timer, in case that the timer expires, triggering the UE to re-detect whether a change of the identification information of the cell occurs, or triggering the UE to detect whether a change of the identification information of the base station corresponding to the current cell occurs.

9. A network device, comprising a processor, a memory, and a network interface, wherein the processor, the memory and the network interface are coupled together by a bus system, the memory is configured to store a computer program which is capable of being run on the processor, and the processor is configured to execute the computer program to:

acquire, through the network interface, identification information of a cell corresponding to a location at which a User Equipment (UE) is located;

store the acquired identification of the cell;

determine a paging TA range for the UE based on the identification information of the cell corresponding to the location at which the UE is located;

set a timer, wherein when the timer expires, the UE is triggered to re-detect whether a change of the identification information of the cell occurs, and receive from the UE updated identification information of the cell, in case that the UE re-initiate registration or location update processing to send the updated identification information of the cell to the network device, or re-initiate an RRC connection and re-send the updated identification information of the cell to the network device when the UE detects that identification information of a cell of a current cell is different from the stored identification information of the cell;

receive, when the UE establishes an RRC connection, the identification information of the cell, at which the UE is located from the base station where the LT is located, wherein the identification information of the cell at which the UE is located is acquired by the base station; and trigger an indication message for sending paging to the base station at which the cell is located, and carry the identification information of the cell in the indication message to indicate, through the indication message, the base station at which the cell is located to send a paging message in the cell corresponding to the identification information of the cell.

10. The network device according to claim 9, wherein the processor is configured to receive, when in an RRC connection state, the identification information of the cell, at which the LT is located, sent from the base station of the UE; wherein, the base station acquires the identification information of the cell at which the UE is located through an RRC signaling or a MAC CE sent by the UE.

11. A UE, comprising a processor, a memory, and a network interface, wherein the processor, the memory and the network interface are coupled together by a bus system, the memory is configured to store a computer program which is capable of being run on the processor, and the processor is configured to execute the computer program to:

report, through the network interface, identification information of a cell or identification information of a base station corresponding to a location at which a User Equipment (UE) is located, to a network device;

send, when establishing an RRC connection, the identification information of the cell or the identification information of the base station, at which the UE is located, to the base station; and initiate, in case of detecting that identification information of a cell of a current cell is different from stored identification information of the cell, when the identification information of the cell is stored, registration or location update processing, and send the updated identification information of the cell to the network device; or, re-initiate an RRC connection, and re-send the updated identification information of the cell to the network device.

12. The UE according to claim 11, wherein the processor is configured to add, when registering initially in a network, the identification information of the cell or the identification information of the base station corresponding to the location at which the UE is located to an attachment request;

send the attachment request to the network-side device.

13. The LIE according to claim 11, wherein the processor is configured to:

add, when a location update is initiated, the identification information of the cell or the identification information of the base station corresponding to the location at which the UE is located to a location update request; and send the location update request to the network device.

14. The UE according to claim 11, wherein the processor is configured to send, when an RRC connection is established, through an RRC signaling or a MAC CE, the identification information of the cell or the identification information of the base station, at which the UE is located, to the base station, wherein, the base station is configured to send the identification information of the cell or the identification information of the base station, at which the UE is located, to the network device to store.

15. The UE according to claim 11, wherein the processor is configured to:

initiate, in case of detecting that identification information of a base station of a current base station is different from stored identification information of the base station, when the identification information of the base station is stored, registration or location update processing, and send the updated identification information of the base station to the network device; or, re-initiate an RRC connection, and re-send the updated identification information of the base station to the network device.

16. The UE according to claim 11, wherein the processor is configured to set a timer, and in case that the timer expires, trigger the UE to re-detect whether a change of the identification information of the cell occurs, or trigger the UE to detect whether a change of the identification information of the base station corresponding to a current cell occurs.

* * * * *